United States Patent [19]

Sawa

[11] Patent Number: 5,412,566
[45] Date of Patent: May 2, 1995

[54] VARIABLE REPLACEMENT APPARATUS

[75] Inventor: Kazuhiro Sawa, Kawasaki, Japan

[73] Assignee: Fujitsu Limited, Kawasaki, Japan

[21] Appl. No.: 128,023

[22] Filed: Sep. 29, 1993

[30] Foreign Application Priority Data

Oct. 1, 1992 [JP] Japan ................... 4-262618

[51] Int. Cl.⁶ ............. G06F 15/20; G06G 7/60
[52] U.S. Cl. ................ 364/419.14; 364/419.1; 395/148; 395/149; 395/150; 395/151
[58] Field of Search ............... 364/419.14, 419.16, 364/419.17, 419.1; 395/131, 144, 145, 148, 149, 150, 151

[56] References Cited

U.S. PATENT DOCUMENTS

| | | | |
|---|---|---|---|
| 5,019,868 | 2/1992 | Pickens et al. | 395/148 |
| 5,101,375 | 3/1992 | Goldhor | 364/419.1 |
| 5,267,155 | 11/1993 | Buchanan et al. | 364/419.14 |

FOREIGN PATENT DOCUMENTS

| | | | |
|---|---|---|---|
| 0089468 | 9/1983 | European Pat. Off. | G06F 3/23 |
| 0233996 | 9/1987 | European Pat. Off. | G06F 15/20 |
| 0315957 | 5/1989 | European Pat. Off. | G06F 15/20 |
| 0394168 | 10/1990 | European Pat. Off. | G06F 15/20 |
| 63-133260 | 6/1988 | Japan . | |
| 4-195529 | 7/1992 | Japan . | |

OTHER PUBLICATIONS

IBM Technical Disclosure Bulletin, "Improved Technique for Printing Multi-copy Documents", vol. 29, No. 1, Jun. 1986, pp. 406-407.
IBM Technical Disclosure Bulletin, "Method for Joining Documents for Printing in a Personal Computer System", vol. 29, No. 7, Dec. 1986, pp. 3090-3091.
IBM Technical Disclosure Bulletin, "Enhanced Technique for Merging Data From a Second Document", vol. 30, No. 5, Oct. 1987, pp. 184-188.

*Primary Examiner*—Gail O. Hayes
*Assistant Examiner*—Stephen R. Tkacs
*Attorney, Agent, or Firm*—Staas & Halsey

[57] ABSTRACT

A variable replacement apparatus which replaces variable names in a text with corresponding variable values, each variable name formed by at least one character and each character in the variable name having a corresponding format. The apparatus includes a variable name extracting unit for extracting a variable name from the text. A variable value acquisition unit obtains a variable value corresponding to the variable name extracted by the variable name extracting unit. A variable name analyzing unit analyzes the corresponding format of each character forming the variable name and a variable value converting unit converts the variable value obtained by the variable value acquisition unit so that the variable value has a format which is determined in accordance with the corresponding format of each character forming the variable name. A variable replacing unit replaces the variable name in the text by the converted variable value.

15 Claims, 10 Drawing Sheets

VARIABLE REPLACEMENT APPARATUS

BACKGROUND OF THE INVENTION

The present invention generally relates to variable replacement apparatuses, and more particularly to a variable replacement apparatus which replaces a converting portion of a text (such as various kinds of define decks, documents and programs that include variables) with variable values converted into a specified format.

A variable replacement function is provided in a computer system. More particularly, a portion of an electronic text which is processed in the computer system is defined as a variable item, that is, as a variable. When actually using this variable portion, the variable portion is replaced by a content which is specified with respect to the variable. This content will hereinafter be referred to as a variable value.

For example, if a display which is made on a display unit by a program is defined as a display field define deck, the variables are described within the text of the display field define deck and the variables are replaced by necessary character strings or the like in order to arbitrarily change and use a portion of the display field define deck.

In such a computer system, it is desirable that the expression of the variables can be specified in a simple manner within the text.

Figure 1:
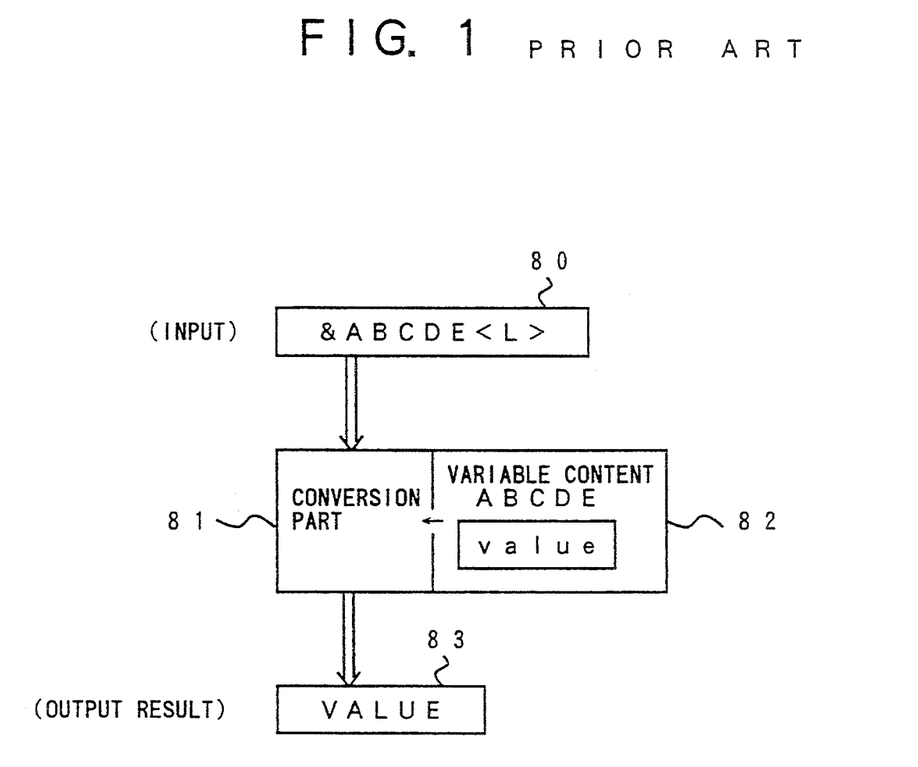
FIG. 1 is a diagram for explaining an example of a conventional conversion.

FIG. 1 shows an example of a conventional conversion. It is assumed that the computer system exchanges data using variables. For example, a conversion part 81 replaces the content (variable value) of the variable which is managed by a variable management part 82, in response to an input 80 which includes the variable as shown in FIG. 1, and outputs the replaced data as an output result 83.

The variable of the input 80 is represented by a character string (variable name) which is added with a character "&" at the head. In this example, the variable name is "ABCDE". Conversion information <L> specifies the conversion format, and in this case, the conversion information <L> specifies that the content of the variable having the variable name "ABCDE" is converted into capital letters and regarded as the variable value. On the other hand, other conversion information includes conversion information <1> which specifies that only the first character of the variable, that is, the character string, is converted into a capital letter.

Based on the input 80 and the variable "ABCDE", the conversion part 81 obtains the content "value" of the variable "ABCDE" from the variable management part 82, and converts the content "value" into the capital letters "VALUE" depending on the conversion information <L>. The capital letters (variable value) "VALUE" are output as the output result 83.

Therefore, when converting the content of the variable into the variable value according to the conventional system, it is necessary to specify the conversion information as added information required for the conversion, in addition to the variable name required to obtain the variable value. For this reason, compared to the case where no conversion is required, there is a problem in that the method of specifying the variable is complicated. In addition, if various kinds of conversions are carried out, there is a problem in that the user must be aware of all of the different kinds of conversion information. Otherwise, the user would be unable to know the format to which each variable value will be converted. In other words, the user cannot simply look at the text to determine the variable names and various conversion information.

SUMMARY OF THE INVENTION

Accordingly, it is a general object of the present invention to provide a novel and useful variable replacement apparatus in which the problems described above are eliminated.

Another and more specific object of the present invention is to provide a variable replacement apparatus comprising variable name extracting means for extracting one or a plurality of variable names from a text which is specified as a subject of conversion, variable value acquisition means for obtaining a variable value corresponding to each variable name extracted by the variable name extracting means, variable name analyzing means for analyzing a representation format of each character forming the variable name, variable value converting means for converting the representation format of the variable value obtained by the variable value acquisition means so as to correspond to a representation format of each character forming the variable name which is analyzed by the variable name analyzing means, and variable replacing means for replacing the variable name in the text by the variable value which is converted by the variable value converting means, so that each variable portion of the text which includes variables is replaced by a corresponding variable value.

According to the variable replacement apparatus of the present invention, it is possible to simply specify the representation format of the variable value solely by the variable name. For example, when defining a display field define deck, it becomes possible to freely specify the representation format of the variable value within a predetermined frame, thereby making it possible to obtain a variable value which suits the needs of the user.

In addition, because the representation format of the variable value is specified by the format of the variable name, the user can easily and visually imagine from the variable name how the variable value will be converted, thereby making it possible to more easily and efficiently utilize the conversion result.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIG. 2.

Figure 2:
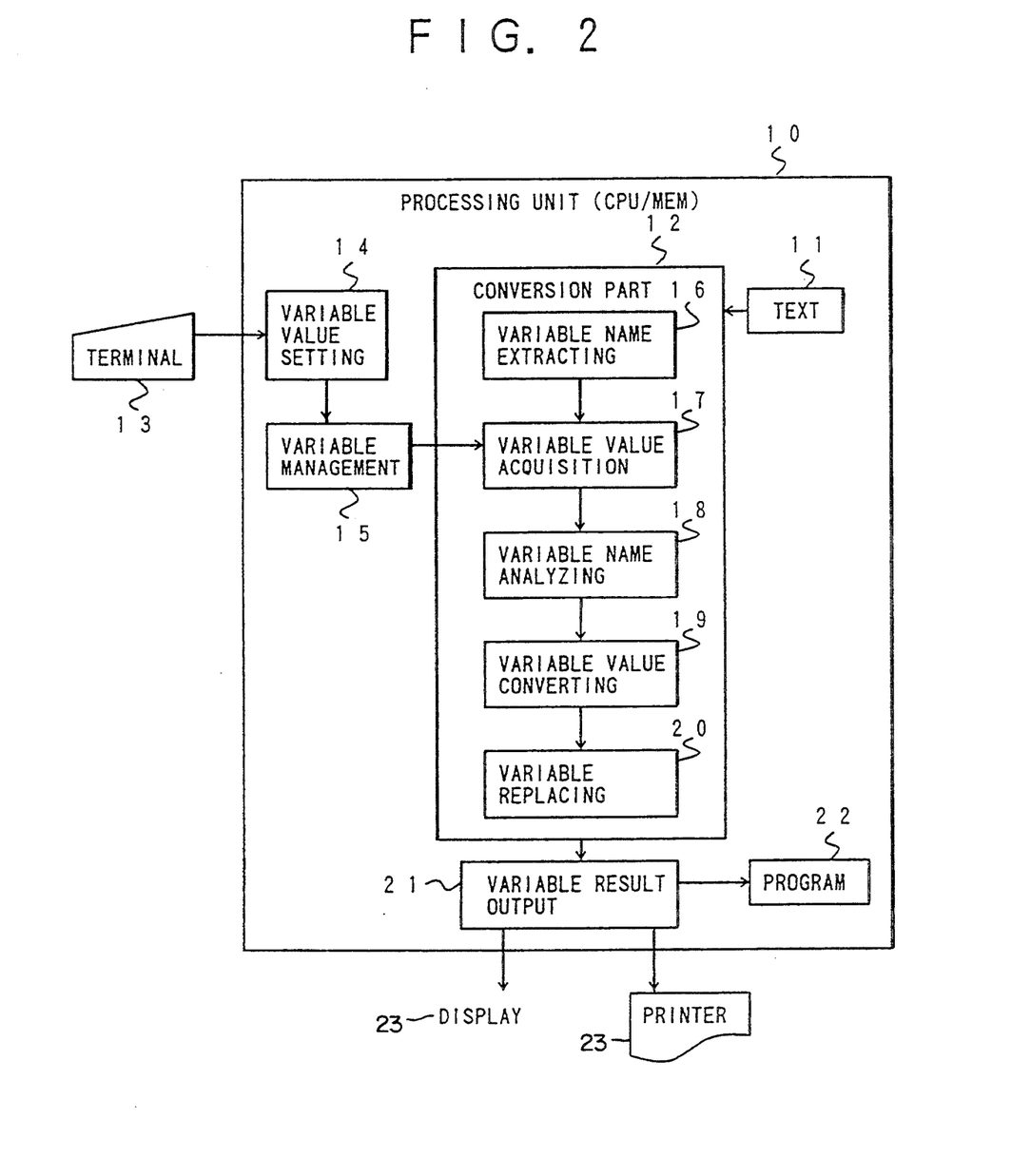
FIG. 2 is a system block diagram for explaining the operating principle of the present invention.

A variable replacement apparatus shown in FIG. 2 generally includes a processing unit 10 which includes a central processing unit (CPU), a memory and the like, a terminal equipment 13 of the user, and output units 23 such as a display unit and a printer. The functions of the CPU forming the processing unit 10 can be regarded as being carried out by a conversion part 12, a variable value setting part 14, a variable management part 15, a variable result output part 21, and a conversion request source program 22. The variable value setting part 14 specifies a variable value corresponding to a variable name. The variable management part 15 manages information such as the variable names, variable values and lengths of the variable values. The conversion request source program 22 receives a conversion result.

The conversion part 12 includes a variable name extracting part 16, a variable value acquisition part 17, a variable name analyzing part 18, a variable value converting part 19, and a variable replacing part 20. The conversion part 12 replaces a variable name by a variable value.

For example, a text 11 (which is the subject of the conversion) is a source program, a document created by a word processing system, a display field define deck or the like, and includes a variable which is to be converted into a variable value. The variable is described by a variable name. The corresponding relationship between the variable names and the variable values is set from the variable value setting part 14 to the variable management part 15, by an input made from the terminal equipment 13, by a specification from a user program or the like.

If there is a conversion instruction to convert the text 11, the variable name extracting part 16 of the conversion part 12 retrieves the text 11 and extracts the variable name. The variable value acquisition part 17 obtains from the variable management part 15 the variable value which corresponds to the variable name which is extracted by the variable name extracting part 16.

The variable name analyzing part 18 analyzes the representation format of the characters forming the variable name, that is, whether the characters forming the variable name are capital or small letters, the coding scheme to which character codes of the variable name belong, and the style of penmanship used for the variable name, for example. The variable value converting part 19 converts the representation format of the variable value which is obtained by the variable name acquisition part 17 so as to correspond to the representation format of the characters forming the analyzed variable name. The variable replacing part 20 replaces the variable name in the input text 11 by the variable value which is obtained by the conversion carried out in the variable value converting part 19.

The conversion result output part 21 outputs the conversion result to the output unit 23, the conversion request source program 22, the terminal equipment 13 or the like which is specified.

Therefore, according to the present invention, there is no need to add the conversion information which is required for the conversion as the added information to the variable name, and the conversion format can be specified simply by the variable name which is required to obtain the variable value. In other words, the conversion format of the variable value is determined by the representation format of the characters forming the variable name. For example, if a part of the variable name is represented by a capital letter, a corresponding part of the variable value is converted into a capital letter and output. Accordingly, the variable name in the text 11 is replaced by the variable value as it appears in the text 11, and the operator can easily imagine the conversion result from the text 11. In addition, the conversion format in the text 11 can also be specified with ease.

Figure 3:
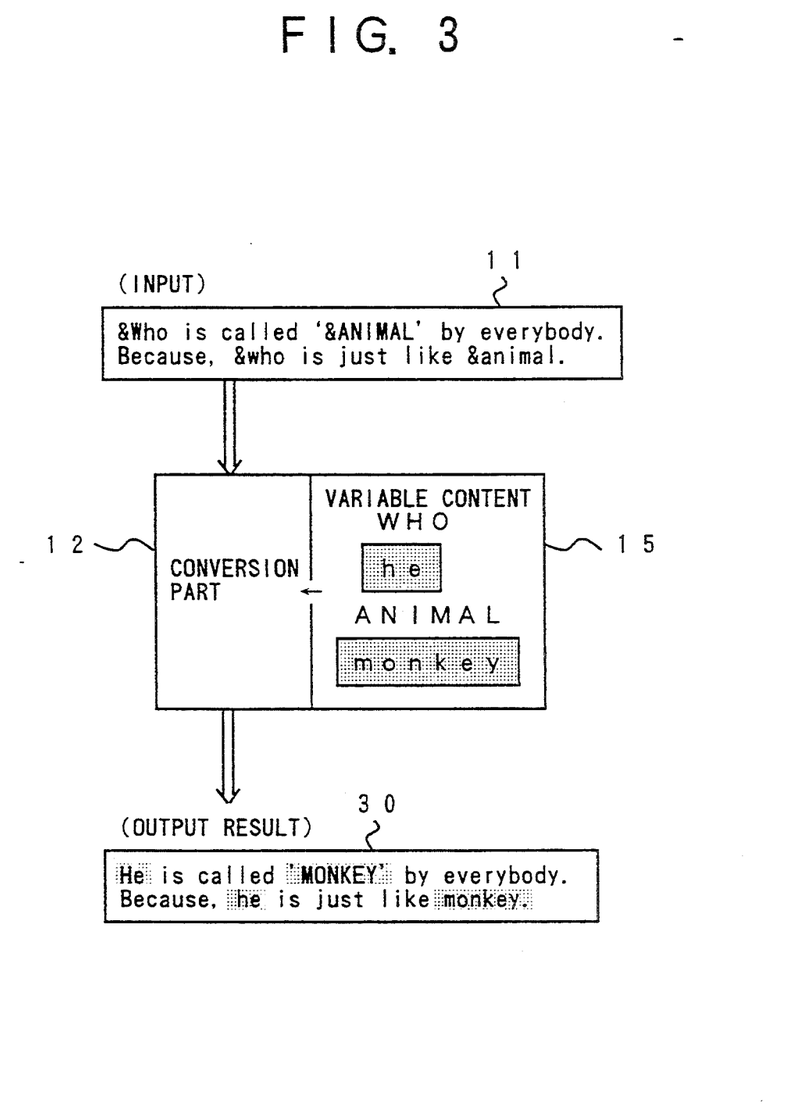
FIG. 3 is a diagram for explaining a conversion in a first embodiment of a variable replacement apparatus according to the present invention.
Figure 4:
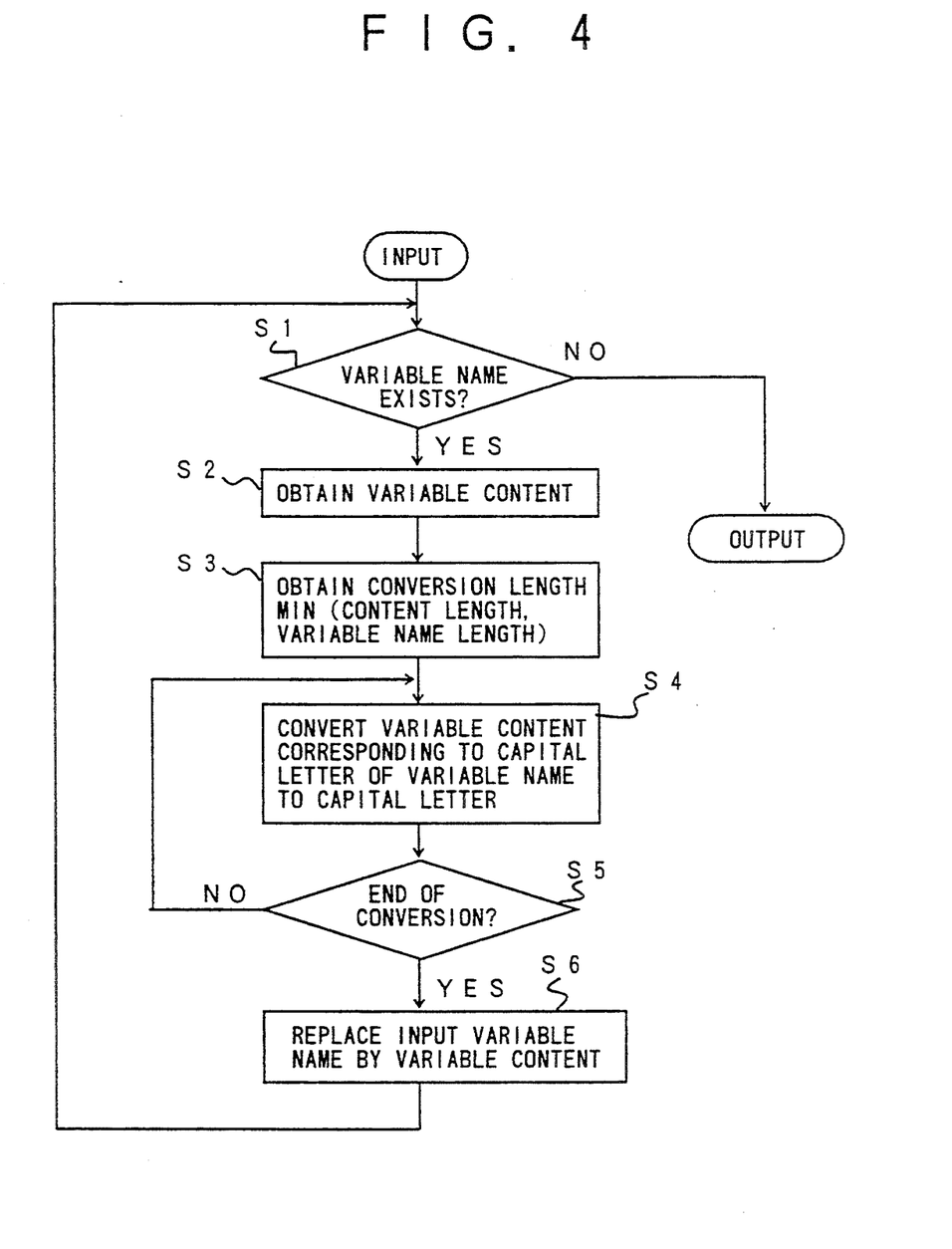
FIG. 4 is a flow chart for explaining the operation of the first embodiment.

Next, a description will be given of a first embodiment of the variable replacement apparatus according to the present invention, by referring to FIGS. 3 and 4. FIG. 3 is a diagram for explaining a conversion which is made in the first embodiment, and FIG. 4 is a flow chart for explaining the operation of the first embodiment.

In this embodiment, the contents (values) of variables corresponding to capital letters of variable names are converted into the capital letters and replace the variables within a text.

Each variable is represented by a character "&" and a variable name which follows the character "&". In the case of a text 11 shown in FIG. 3, there are four variables, namely, "&Who", "&ANIMAL", "&who" and "&animal". Although the variables "&Who" and "&who" specify the same variable content (value), the two specify different conversion formats. Similarly, although the variables "&ANIMAL" and "&animal" specify the same variable content (value), the two specify different conversion formats.

In this embodiment, the conversion part 12 shown in FIG. 3 inputs the text 11 and extracts the variable names. The variable names "WHO" and "ANIMAL" are extracted if the representation format is neglected. Hence, the variable contents (values) corresponding to these variable names "WHO" and "ANIMAL" are obtained from the variable management part 15. In this particular case, the variable contents corresponding to the variable names "WHO" and "ANIMAL" respectively are "he" and "monkey"

The conversion part 12 converts the variable contents as follows depending on the capital/small letter representation formats of the variable names within the text 11. In other words, the variable content "he" is converted into "He" in the case of the variable name "&Who", and the variable content "monkey" is converted into "MONKEY" in the case of the variable name "&ANIMAL". On the other hand, in the case of the variable names "&who" and "&animal" which are in small letters, the variable contents "he" and "monkey" are used. As a result, the conversion result in the conversion part 12 becomes as indicated by an output result 30 in FIG. 3.

The flow chart of FIG. 4 shows the operation of the conversion part 12 in the first embodiment.

In FIG. 4, a step S1 retrieves the text 11 and extracts the variable names with respect to the conversion request which requests the conversion of the text 11, and decides whether or not a variable name exists. If the processing with respect to all of the variable names in the text 11 ends, the decision result in the step S1 is NO, and in this case, the process ends after outputting the conversion result.

On the other hand, if the decision result in the step S1 is YES, a step S2 obtains the variable content corresponding to the extracted variable name. Then, a step S3 obtains a conversion length. In this embodiment, the shorter one of the length of the variable name and the length of the variable content registered in the variable management part 15 is regarded as the conversion length. For example, if the length of the variable content is longer than the length of the variable name by a certain length, the latter half of the variable content amounting to the certain length is truncated.

Thereafter, a step S4 converts the variable content corresponding to capital letters of the variable name into capital letters. In addition, a step S5 decides if the end of the conversion is reached, and the process returns to the step S4 if the decision result in the step S5 is NO. That is, with respect to each character of the variable name, the step S4 is repeated by an amount corresponding to the conversion length. If the conversion ends and the decision result in the step S5 becomes YES, a step S6 replaces the input variable name in the text 11 by the variable content, and the process returns to the step S1. Hence, the above described operation is repeated similarly for the next variable name.

Figure 5:
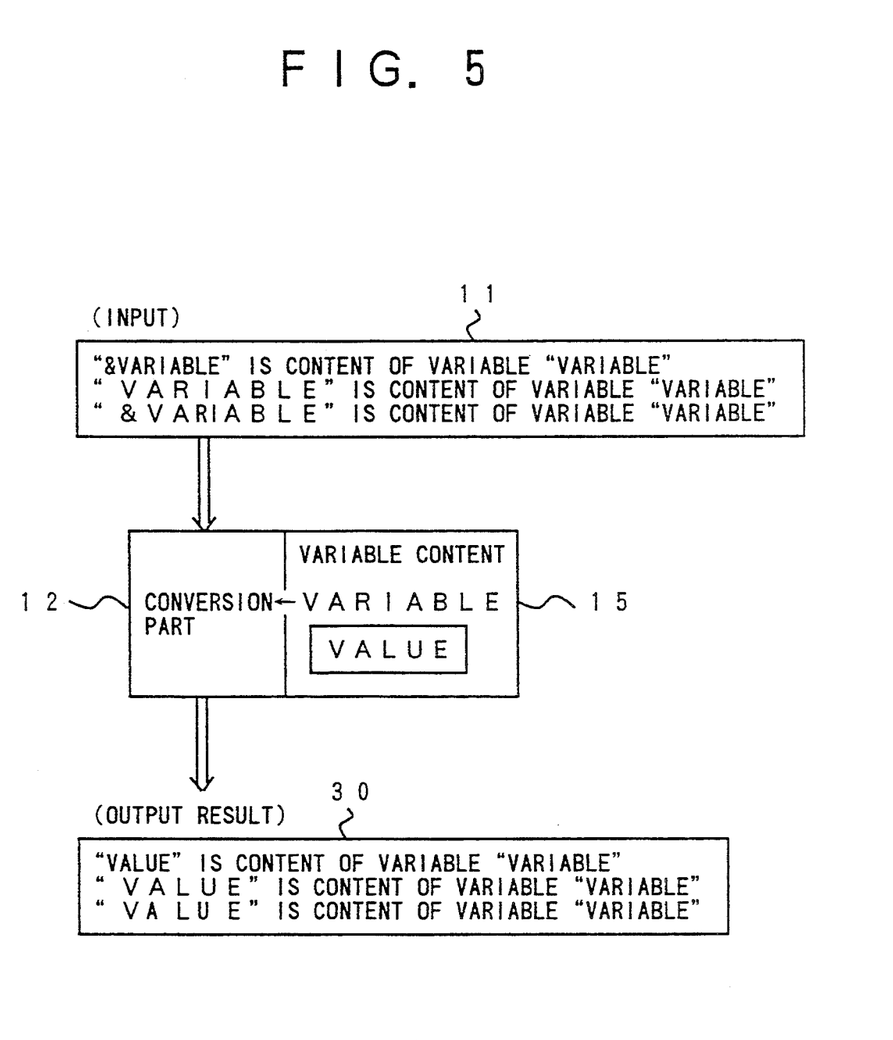
FIG. 5 is a diagram for explaining the conversion in a second embodiment of the variable replacement apparatus according to the present invention.
Figure 6:
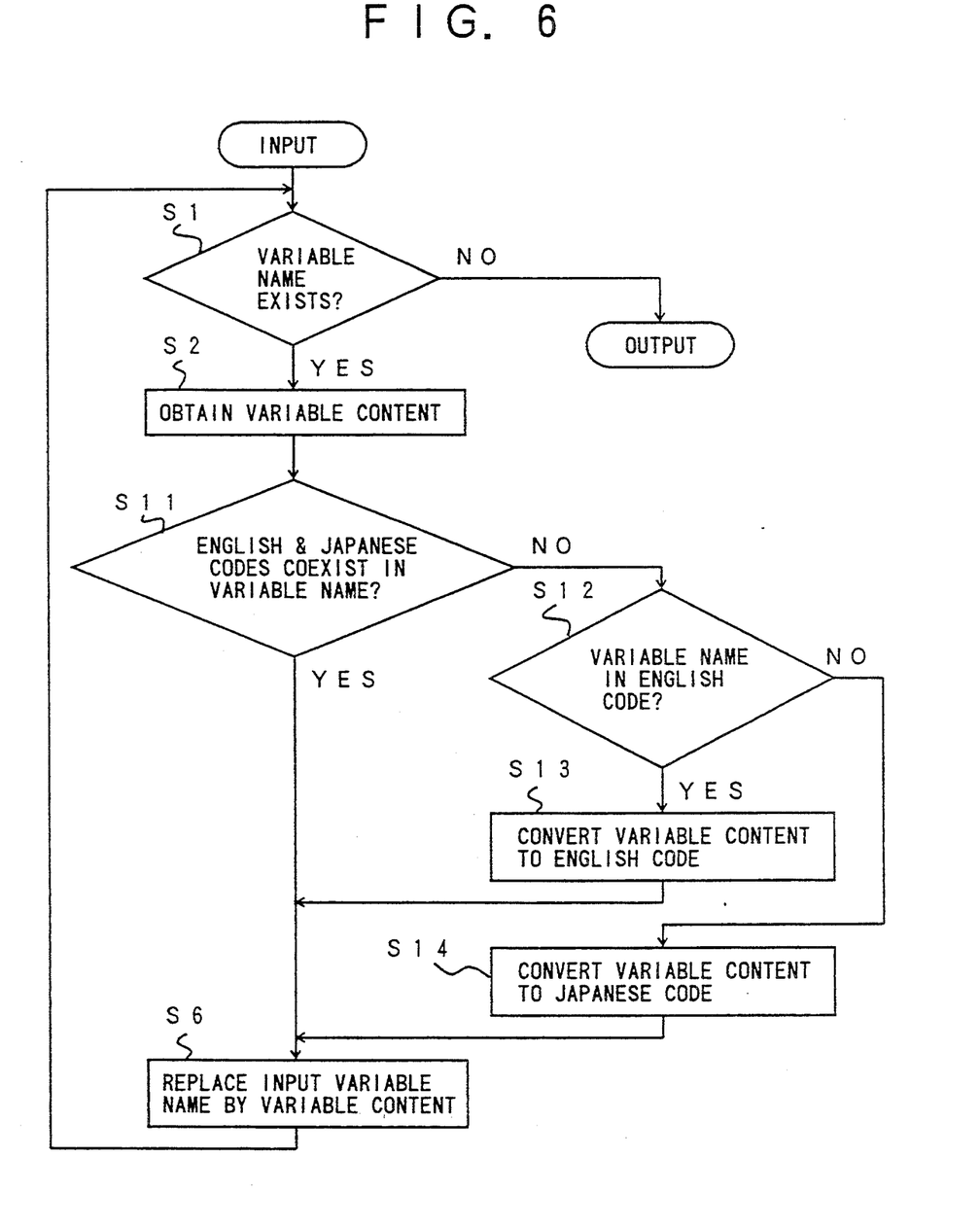
FIG. 6 is a flow chart for explaining the operation of the second embodiment.

Next, a description will be given of a second embodiment of the variable replacement apparatus according to the present invention, by referring to FIGS. 5 and 6. FIG. 5 is a diagram for explaining a conversion which is made in the second embodiment, and FIG. 6 is a flow chart for explaining the operation of the second embodiment.

In this embodiment, the variable content (value) is converted depending on a code which is specified by the variable name, and replaces the variable within the text. Each code is made up of one byte in the case of an English code, and is made up of two bytes in the case of a character code of a Japanese code. If the variable names are specified by a mixture of English and Japanese codes, the variable content itself is used as the variable value.

Even if the English characters (alphabets) are the same, each character is represented by one byte which will hereinafter be referred to as an "English code" in the case of an EBCDIC code, for example, and is represented by two bytes which will hereinafter be referred to as a "Japanese code" in the case of a Japanese JIS code, for example. Normally, on the display unit or the like, the English code is displayed as a half size character, while the Japanese code is displayed as a full size character, and the English code and the Japanese code are distinguished from each other.

In the case of a text 11 shown in FIG. 5, there are three variables, namely, the variable "&VARIABLE" which has the variable name in the English code in its entirety and is made up of the half size characters, the variable "＆ ＶＡＲＩＡＢＬＥ" which has the variable name in the Japanese code in its entirety and is made up of the full size characters, and the variable "＆ ＶＡ RI ＡＢＬＥ" which has the variable name in a mixture of both the English and Japanese codes and is made up of a mixture of the half and full size characters. In this case, the characters "R" and "I" are half size characters, while the remaining characters are full size characters. Although these three variables specify the same variable content (value), the three specify different conversion formats.

The conversion part 12 shown in FIG. 5 inputs the text 11 and extracts the variable names. The variable name is "VARIABLE" if the representation format is neglected, and the variable content (value) of this variable is obtained from the variable management part 15. In this case, the variable content is "VALUE", where the characters "V", "L" and "E" are full size characters and the characters "A" and "U" are half size characters.

The conversion part 12 converts the variable content depending on whether the variable name within the text consists solely of the English code, consists solely of the Japanese code, or is made up of a mixture of the English and Japanese codes. Hence, the conversion result of the conversion part 12 becomes an output result 30 shown in FIG. 5.

The flow chart of FIG. 6 shows the operation of the conversion part 12 in the second embodiment.

In FIG. 6, a step S1 retrieves the text 11, extracts the variable names with respect to the conversion request which requests the conversion of the text 11, and decides whether or not a variable name exists. If the processing with respect to all of the variable names in the text 11 ends, the decision result in the step S1 is NO, and in this case, the process ends after outputting the conversion result.

On the other hand, if the decision result in the step S1 is YES, a step S2 obtains the variable content corresponding to the extracted variable name. Then, a step S11 decides whether or not the variable name is represented by a mixture of the English and Japanese codes. The process advances to a step S6 if the decision result in the step S11 is YES.

If the decision result in the step S11 is NO, a step S12 decides whether or not the variable name is represented solely by the English code. A step S14 converts the variable content into the Japanese code if the decision result in the step S12 is NO. But if the decision result in the step S12 is YES, a step S13 converts the variable content into the English code, and the process advances to the step S6.

If the decision result in the step S11 is YES or after the step S13 or S14, the step S6 replaces the input variable name in the text 11 by the variable content, and the process returns to the step S1. Hence, the above described operation is repeated similarly for the next variable name.

Figure 7:
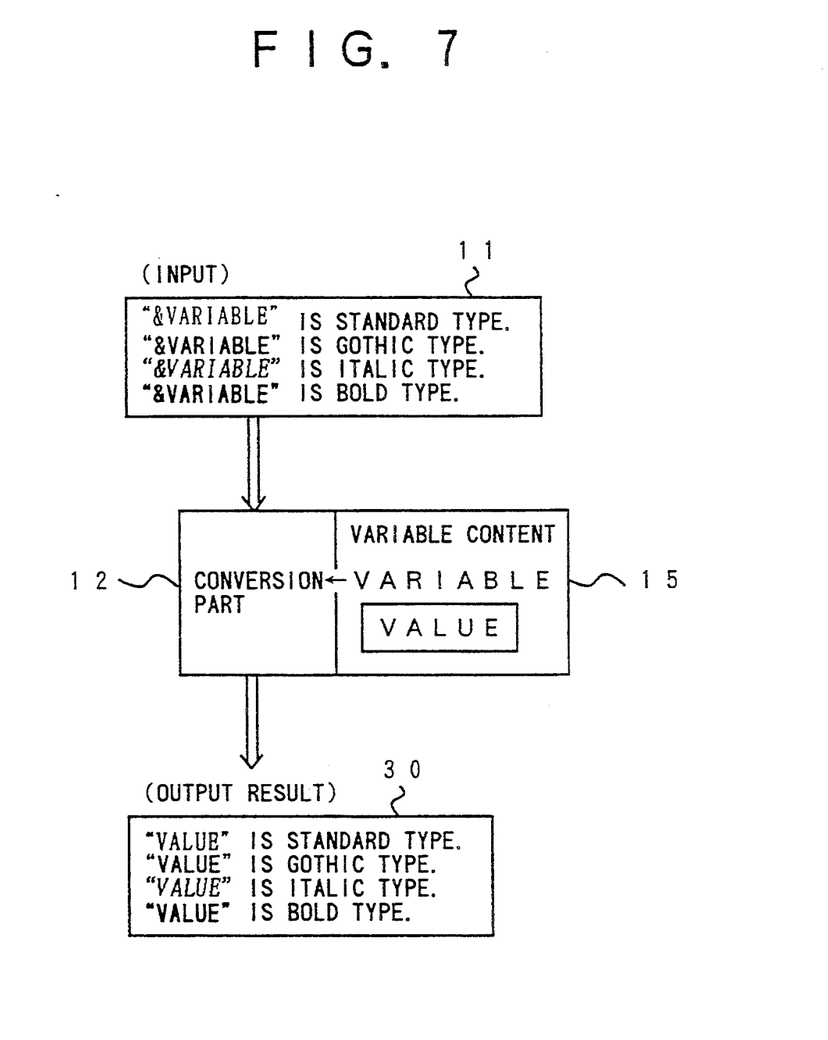
FIG. 7 is a diagram for explaining the conversion in a third embodiment of the variable replacement apparatus according to the present invention.
Figure 8:
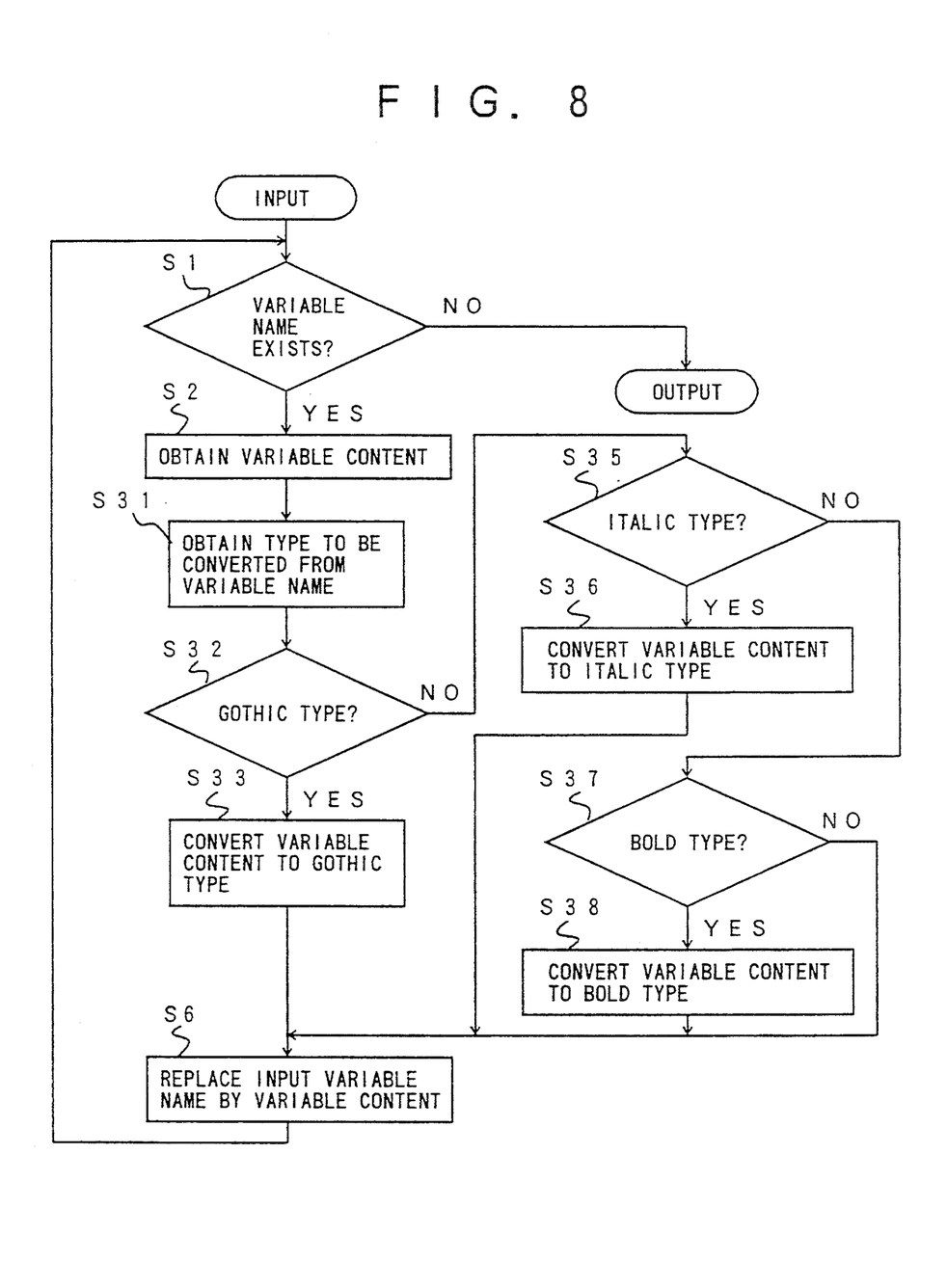
FIG. 8 is a flow chart for explaining the operation of the third embodiment.

Next, a description will be given of a third embodiment of the variable replacement apparatus according to the present invention, by referring to FIGS. 7 and 8. FIG. 7 is a diagram for explaining a conversion which is made in the third embodiment, and FIG. 8 is a flow chart for explaining the operation of the third embodiment.

In this embodiment, the variable content (value) is converted into the style of penmanship (type or font) specified by the variable name, and replaces the variable in the text.

In the case of a text 11 shown in FIG. 7, the variable is "&VARIABLE" On the other hand, the variable name has four kinds, namely, the variable name represented by standard type (or font), the variable name represented by a Gothic type, the variable name represented by an italic type, and the variable name represented by a bold or highlighted type which has emphasized edges.

The conversion part 12 shown in FIG. 7 inputs the text 11 and extracts the variable names. The variable name is "VARIABLE" if the representation format is neglected, and the variable content (value) is obtained from the variable management part 15. The variable content is "VALUE".

The conversion part 12 converts the variable content depending on the style of penmanship (type or font) of the variable name within the text 11, and thus, the conversion result in the conversion part 12 becomes an output result 30 shown in FIG. 7.

The flow chart of FIG. 8 shows the operation of the conversion part 12 in the third embodiment.

In FIG. 8, a step S1 retrieves the text 11 and extracts the variable names with respect to the conversion request which requests the conversion of the text 11, and decides whether or not a variable name exists. If the processing with respect to all of the variable names in the text 11 ends, the decision result in the step S1 is NO, and in this case, the process ends after outputting the conversion result.

On the other hand, if the decision result in the step S1 is YES, a step S2 obtains the variable content corresponding to the extracted variable name. Then, a step S31 obtains the style of penmanship (type or font) of the variable name, and determines the style of penmanship (type or font) to which the variable name is to be converted. A step S32 decides whether or not the style of penmanship of the variable name is the Gothic type. If the decision result in the step S32 is YES, a step S33 converts the variable content into the Gothic type, and the process advances to a step S6.

But if the decision result in the step S32 is NO, a step S35 decides whether or not the style of penmanship of the variable name is the italic type. If the decision result in the step S35 is YES, a step S36 converts the variable content into the italic type, and the process advances to the step S6.

On the other hand, if the decision result in the step S35 is NO, a step S37 decides whether or not the style of penmanship of the variable name is the bold or highlighted type. If the decision result in the step S37 is YES, a step S38 converts the variable content into the bold or highlighted type, and the process advances to the step S6. If the decision result in the step S37 is NO, the process advances to the step S6.

The step S6 replaces the input variable name in the text 11 by the variable content, and the process returns to the step S1. Hence, the above described operation is repeated similarly for the next variable name.

Figure 9:
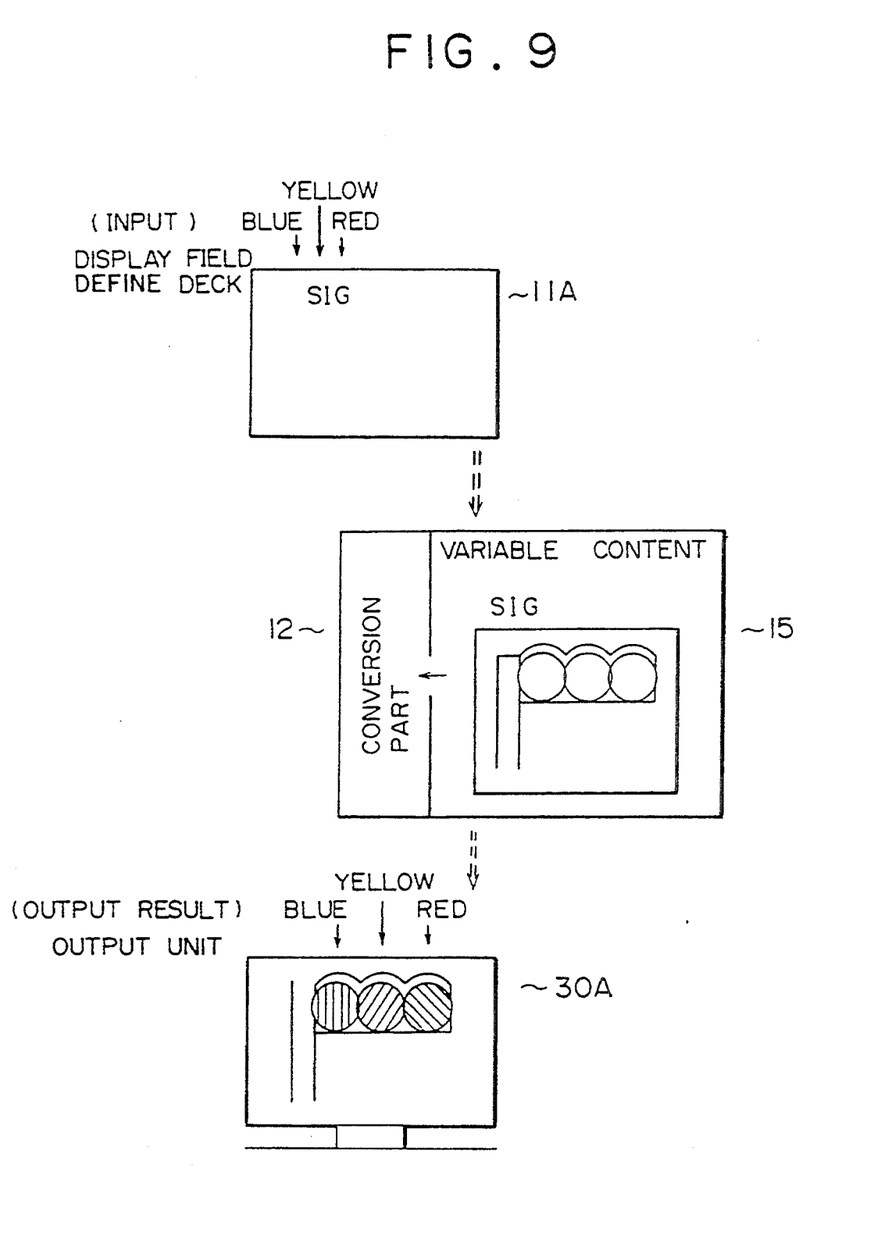
FIG. 9 is a diagram for explaining the conversion in a fourth embodiment of the variable replacement apparatus according to the present invention.
Figure 10:
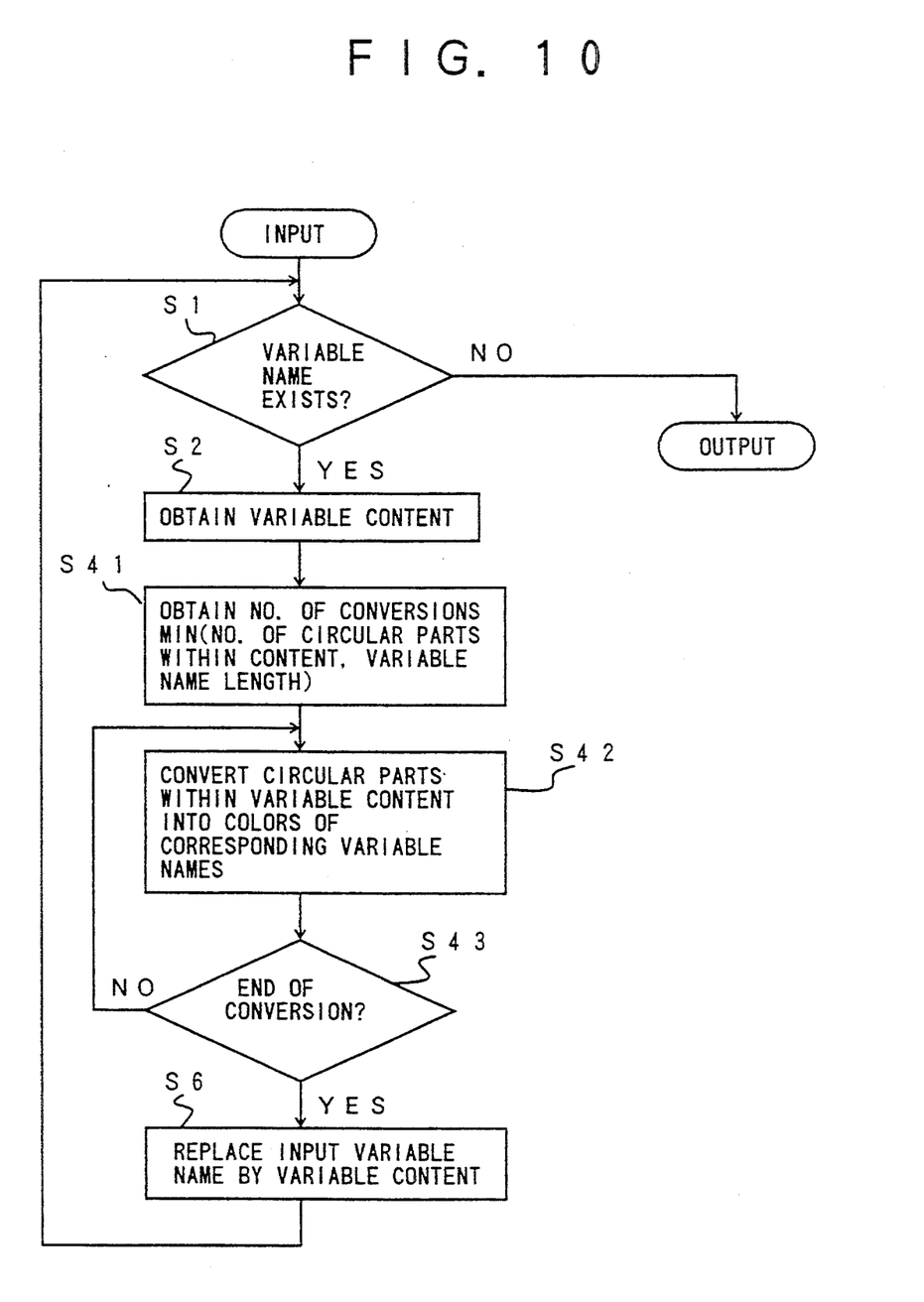
FIG. 10 is a flow chart for explaining the operation of the fourth embodiment.

Next, a description will be given of a fourth embodiment of the variable replacement apparatus according to the present invention, by referring to FIGS. 9 and 10. FIG. 9 is a diagram for explaining a conversion which is made in the fourth embodiment, and FIG. 10 is a flow chart for explaining the operation of the fourth embodiment.

In this embodiment, the variable content (value) is a color graphic datum related to a traffic light, for example. Hence, the variable content (value) is converted depending on the color of the character or information specified by the variable name, and replaces the variable within a display field define deck 11A. In this particular case, the leftmost character of the variable name corresponds to the leftmost light emitting part of the traffic light, the center character of the variable name corresponds to the center light emitting part of the traffic light, and the rightmost character of the variable name corresponds to the rightmost light emitting part of the traffic light.

In the case of the display field define deck 11A shown in FIG. 9, which corresponds to the text described above, the variable name "SIG" is specified by different colors in its entirety. In FIG. 9, the leftmost character "S" of the variable name corresponds to "blue", the center character "I" corresponds to "yellow", and the rightmost character "G" corresponds to "red".

The conversion part 12 shown in FIG. 9 inputs the display field define deck 11A and extracts the variable name. In this case, the variable name is "SIG", and the corresponding variable content (value) is obtained from the variable management part 15. The variable content is the color graphic datum related to the traffic light.

The conversion part 12 converts the variable content depending on the color of the variable name within the display field define deck 11A, where the variable content in this case is the color graphic datum related to the color of the light emitting part of the traffic light.

The conversion result of the conversion part 12 is output as an output result 30A shown in FIG. 9. In this output result 30A, the variable name is replaced such that the leftmost light emitting part of the traffic light is blue, the center light emitting part is yellow, and the rightmost light emitting part is red.

The flow chart of FIG. 10 shows the operation of the conversion part 12 in the fourth embodiment.

In FIG. 10, a step S1 retrieves the display field define deck 11A and extracts the variable names with respect to the conversion request which requests the conversion of the display field define deck 11A, and decides whether or not a variable name exists. If the processing with respect to all of the variable names in the display field define deck 11A ends, the decision result in the step S1 is NO, and in this case, the process ends after outputting the conversion result.

On the other hand, if the decision result in the step S1 is YES, a step S2 obtains the variable content corresponding to the extracted variable name. Then, a step S41 obtains the number of conversions. In this particular case, the smaller one of the length of the variable name and the number of circular parts (corresponding to the light emitting parts of the traffic light) in FIG. 9 found from the extracted variable content is taken as the number of conversions. For example, if the number of circular parts in the variable content is larger than the length of the variable name by a certain amount, the circular parts of the variable contents amounting to the certain amount are not converted.

Next, a step S42 converts the circular parts within the variable content by the colors of the corresponding variable names. A step S43 decides whether or not an end of the conversion is reached, and the process returns to the step S42 if the decision result in the step S43 is NO. Hence, the step S43 is repeated by an amount corresponding to the number of variables.

On the other hand, if the decision result in the step S43 is YES, the step S6 replaces the input variable name in the display field define deck 11A by the variable content, and the process returns to the step S1. Hence, the above described operation is repeated similarly for the next variable name.

As a first modification of the first embodiment described in conjunction with the flow chart of FIG. 4, the step S4 may convert a first datum of the variable content (value) depending on the attribute of a first character of the variable name and convert second and subsequent data of the variable content depending on the attribute of a second character of the variable name.

In addition, as a second modification of the first embodiment, the step S4 may convert an nth datum of the variable content (value) depending on the attribute of an nth character of the variable name, where n is an arbitrary integer.

Furthermore, as a third modification of the first embodiment, the step S4 may convert an mth datum of the variable content (value) depending on the attribute of an nth character of the variable name, where m and n are mutually different arbitrary integers.

As a fourth modification of the first embodiment, the step S4 may convert the entire variable content (value) depending on the attribute of the entire variable name. In this case, if the step S3 detects that the length of the variable name is shorter than the length of the variable content (value), it is possible to provide a step of adding dummy characters to the variable name after the step S3 and before the step S4 in FIG. 4. Alternatively, if the length of the variable name is shorter than the length of the variable content, it is possible to repeat the character sequence of the variable name for a length corresponding to the difference between the two lengths.

In addition, as a fifth modification of the first embodiment, the step S4 may convert an mth datum of the variable content (value) depending on the attribute of the entire variable name, where m is an arbitrary integer.

Further, the present invention is not limited to these embodiments, but various variations and modifications may be made without departing from the scope of the present invention.

What is claimed is:

1. A variable replacement apparatus which replaces variable names in a text with corresponding variable values, each variable name formed by at least one character and each character in the variable name having a corresponding format, the apparatus comprising:
    variable name extracting means for extracting a variable name from the text;
    variable value acquisition means for obtaining a variable value corresponding to the variable name extracted by said variable name extracting means;
    variable name analyzing means for analyzing the corresponding format of each character forming the variable name;
    variable value converting means for converting the variable value obtained by said variable value acquisition means so that the variable value has a format which is determined in accordance with the corresponding format of each character forming the variable name; and
    variable replacing means for replacing the variable name in the text by the converted variable value.

2. The variable replacement apparatus as claimed in claim 1, which further comprises output means for outputting the converted variable value.

3. The variable replacement apparatus as claimed in claim 2, wherein said output means outputs the converted variable value to a device selected from the group comprising a terminal equipment, an output unit and a source program which requests the conversion of the text, said output unit including a display and a printer.

4. The variable replacement apparatus as claimed in claim 1, wherein the text is selected from the group comprising a display field define deck, a document and a source program.

5. The variable replacement apparatus as claimed in claim 1, wherein said variable name analyzing means analyzes the corresponding formats of respective characters forming the variable name, the corresponding formats including capital letters and small letters.

6. The variable replacement apparatus as claimed in claim 1, wherein said variable name analyzing means analyzes the corresponding formats of respective characters forming the variable name, the corresponding formats including different character codes.

7. The variable replacement apparatus as claimed in claim 1, wherein said variable name analyzing means analyzes the corresponding formats of respective characters forming the variable name, the corresponding formats including different style of penmanship, type or font.

8. The variable replacement apparatus as claimed in claim 1, wherein said variable name analyzing means analyzes the corresponding formats of respective characters forming the variable name, the corresponding formats including different colors.

9. The variable replacement apparatus as claimed in claim 1, wherein the variable name is formed by at least two characters and the variable value is formed by at least two datum, said variable value converting means converts a first datum of the variable value in accordance with the corresponding format of a first character of the variable name and converts second and any subsequent datum of the variable value in accordance with the corresponding format of a second character of the variable name.

10. The variable replacement apparatus as claimed in claim 1, wherein the variable name is formed by at least n characters and the variable value is formed by at least n datum, said variable value converting means converts an nth datum of the variable value in accordance with the corresponding format of an nth character of the variable name, where n is an arbitrary integer.

11. The variable replacement apparatus as claimed in claim 1, wherein the variable value is formed by at least m datum and the variable name is formed by at least n characters, said variable value converting means converts an mth datum of the variable value in accordance with the corresponding format of an nth character of the variable name, where m and n are mutually different arbitrary integers.

12. The variable replacement apparatus as claimed in claim 1, wherein the same format corresponds to each character in the variable name and said variable value converting means converts the entire variable value in accordance with the corresponding same format of the characters in the variable name.

13. The variable replacement apparatus as claimed in claim 12, wherein said variable value converting means inserts dummy characters into the variable name if the number of characters forming the variable name is less than the number of datum forming the variable value.

14. The variable replacement apparatus as claimed in claim 12, wherein said variable value converting means repeats a character sequence of the variable name if the number of characters forming the variable name is less than the number of datum forming the variable value.

15. The variable replacement apparatus as claimed in claim 1, wherein the variable value includes at least m datum and the same format corresponds to each character forming the variable name, said variable value converting means converts an mth datum of the variable value depending on the same format corresponding to the characters in the variable name, where m is an integer.

* * * * *